US008991871B2

(12) United States Patent
Weinhold

(10) Patent No.: US 8,991,871 B2
(45) Date of Patent: Mar. 31, 2015

(54) APPARATUS FOR CONNECTING DOUBLE JACKETED PIPES (TWO-PART PIPE COUPLING PART)

(76) Inventor: Richard Weinhold, Neuss (DE)

( * ) Notice: Subject to any disclaimer, the term of this patent is extended or adjusted under 35 U.S.C. 154(b) by 55 days.

(21) Appl. No.: 13/600,372

(22) Filed: Aug. 31, 2012

(65) Prior Publication Data
US 2013/0049355 A1      Feb. 28, 2013

(30) Foreign Application Priority Data

Aug. 31, 2011 (DE) .......................... 10 2011 111 524
May 18, 2012 (DE) ..................... 20 2012 101 837 U

(51) Int. Cl.
| F16L 19/00 | (2006.01) |
|---|---|
| F16L 39/00 | (2006.01) |
| F16L 37/56 | (2006.01) |
| F16L 3/12 | (2006.01) |

(52) U.S. Cl.
CPC ............. *F16L 39/005* (2013.01); *F16L 37/565* (2013.01); *F16L 3/1222* (2013.01)
USPC ................... 285/123.3; 285/123.12; 285/364; 285/354; 285/414

(58) Field of Classification Search
CPC ........... F16L 23/10; F16L 23/08; F16L 23/06; F16L 37/56; F16L 39/00
USPC .............. 285/123.3, 123.4, 123.12, 416, 406, 285/364, 354, 386, 388, 414
See application file for complete search history.

(56) References Cited

U.S. PATENT DOCUMENTS

| 1,389,768 | A | * | 9/1921 | McFarland | ................. | 285/123.3 |
|---|---|---|---|---|---|---|
| 1,521,482 | A | * | 12/1924 | Steele | ......................... | 285/123.3 |
| 4,067,596 | A | * | 1/1978 | Kellner et al. | .............. | 285/123.3 |
| 4,082,323 | A | * | 4/1978 | Wood et al. | ................. | 285/123.3 |
| 6,039,216 | A | | 3/2000 | Cummings | | |
| 7,284,771 | B2 | * | 10/2007 | Baumann et al. | ........... | 285/123.3 |
| 8,074,687 | B2 | * | 12/2011 | Queau et al. | ................ | 285/123.3 |
| 8,608,208 | B2 | * | 12/2013 | Cafri | .......................... | 285/123.3 |

FOREIGN PATENT DOCUMENTS

| AT | 226173 | 3/1963 |
|---|---|---|
| AT | 226173 B | 3/1963 |
| DE | 33 24 271 A1 | 1/1985 |
| DE | 3324271 A1 | 1/1985 |
| DE | 102009043024 A1 | 3/2011 |
| DE | 10 2009 052 674 A1 | 5/2011 |
| DE | 102009052674 A1 | 5/2011 |
| DE | 102010009360 A1 | 8/2011 |

* cited by examiner

*Primary Examiner* — David E Bochna
(74) *Attorney, Agent, or Firm* — Berenato & White, LLC

(57) ABSTRACT

An apparatus for connecting double jacketed pipes is provided. The apparatus includes two pipe coupling parts corresponding to one another and a locking element for axially connecting the pipe coupling parts:

at least one of the pipe coupling parts being divided in form and having two separate components, namely an inner component which is formed by an inner ring or at least includes the latter and has an external thread, and an outer component which is formed by an outer ring or includes the latter, and has an internal thread corresponding to the external thread of the inner component so that the outer component can be screwed onto the inner component.

18 Claims, 6 Drawing Sheets

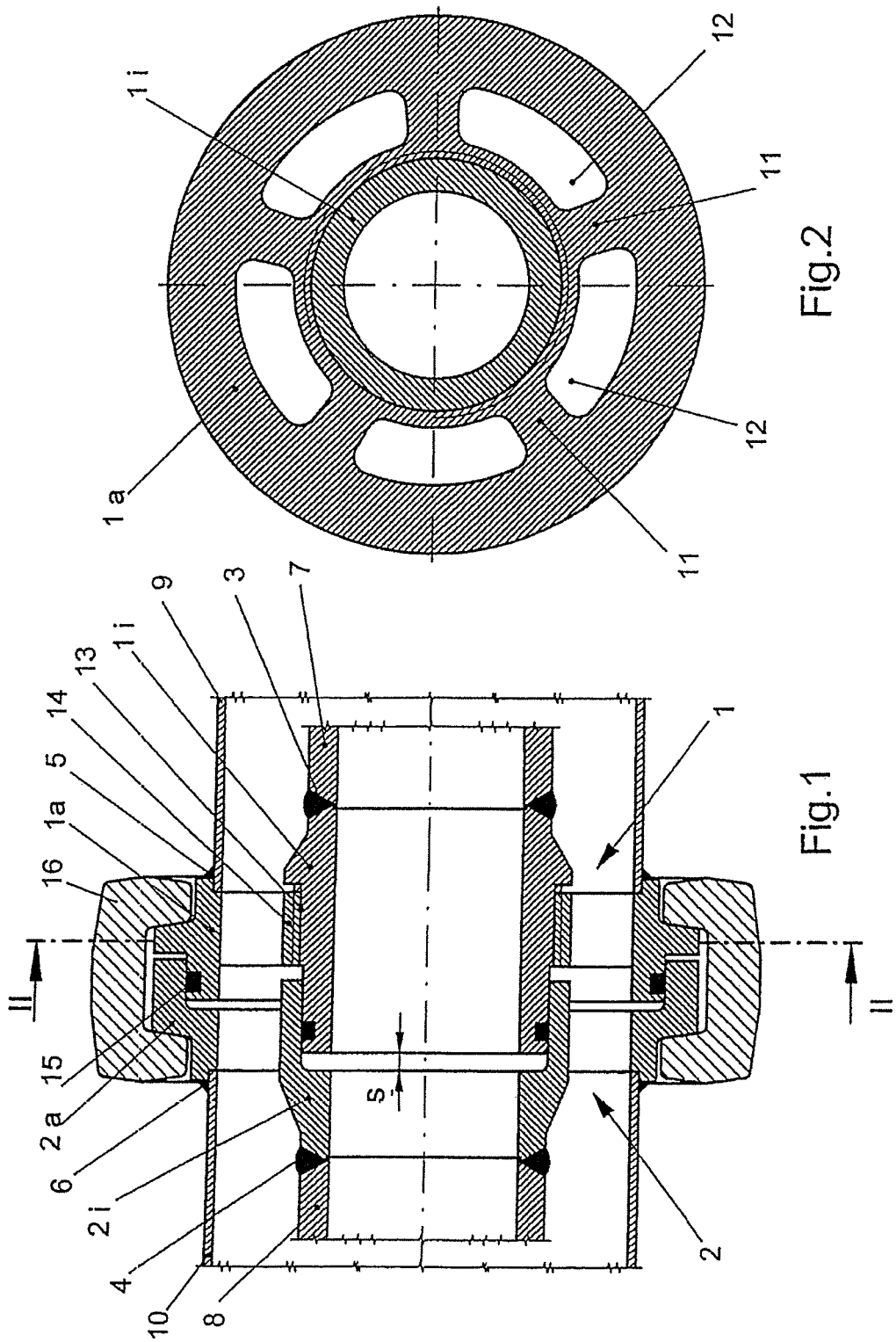

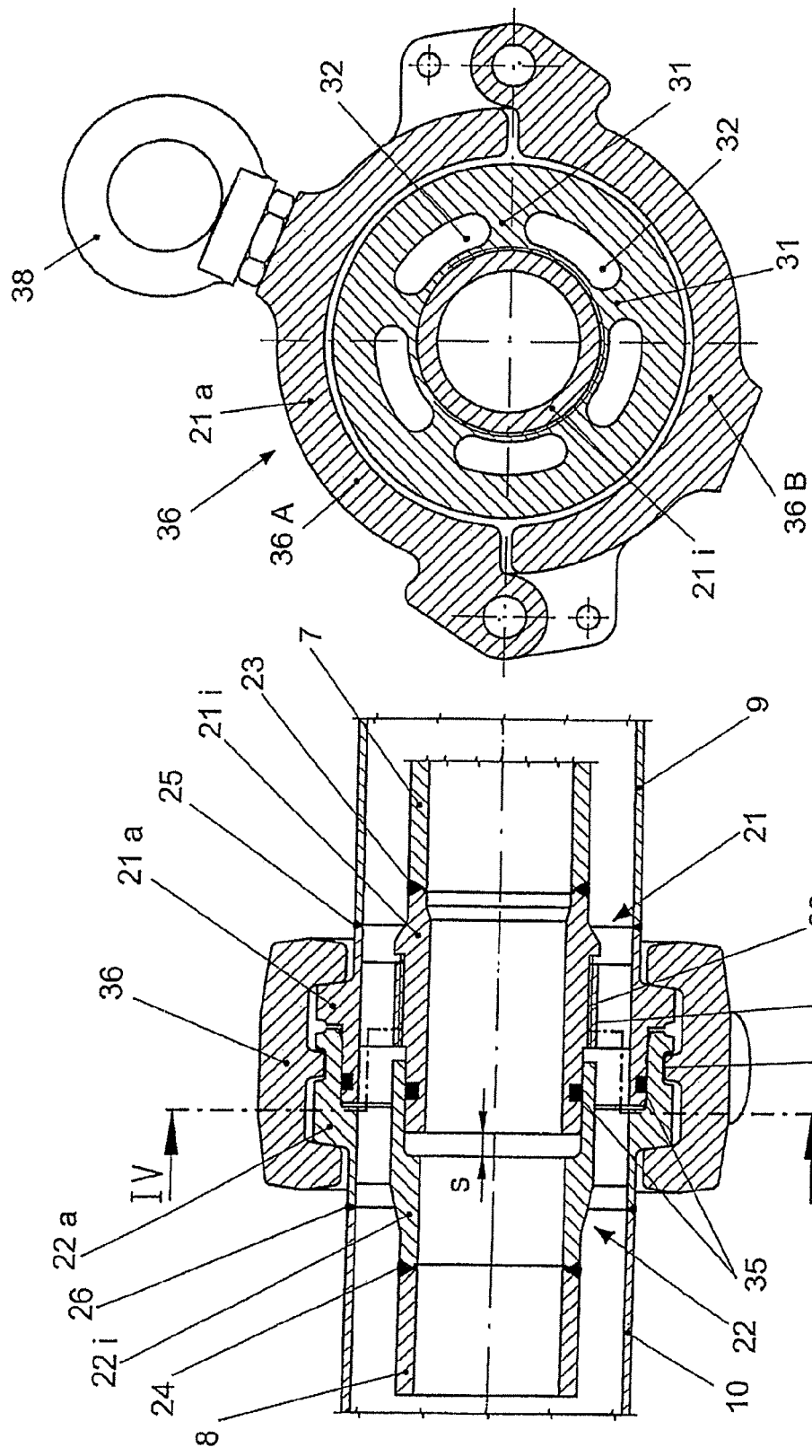

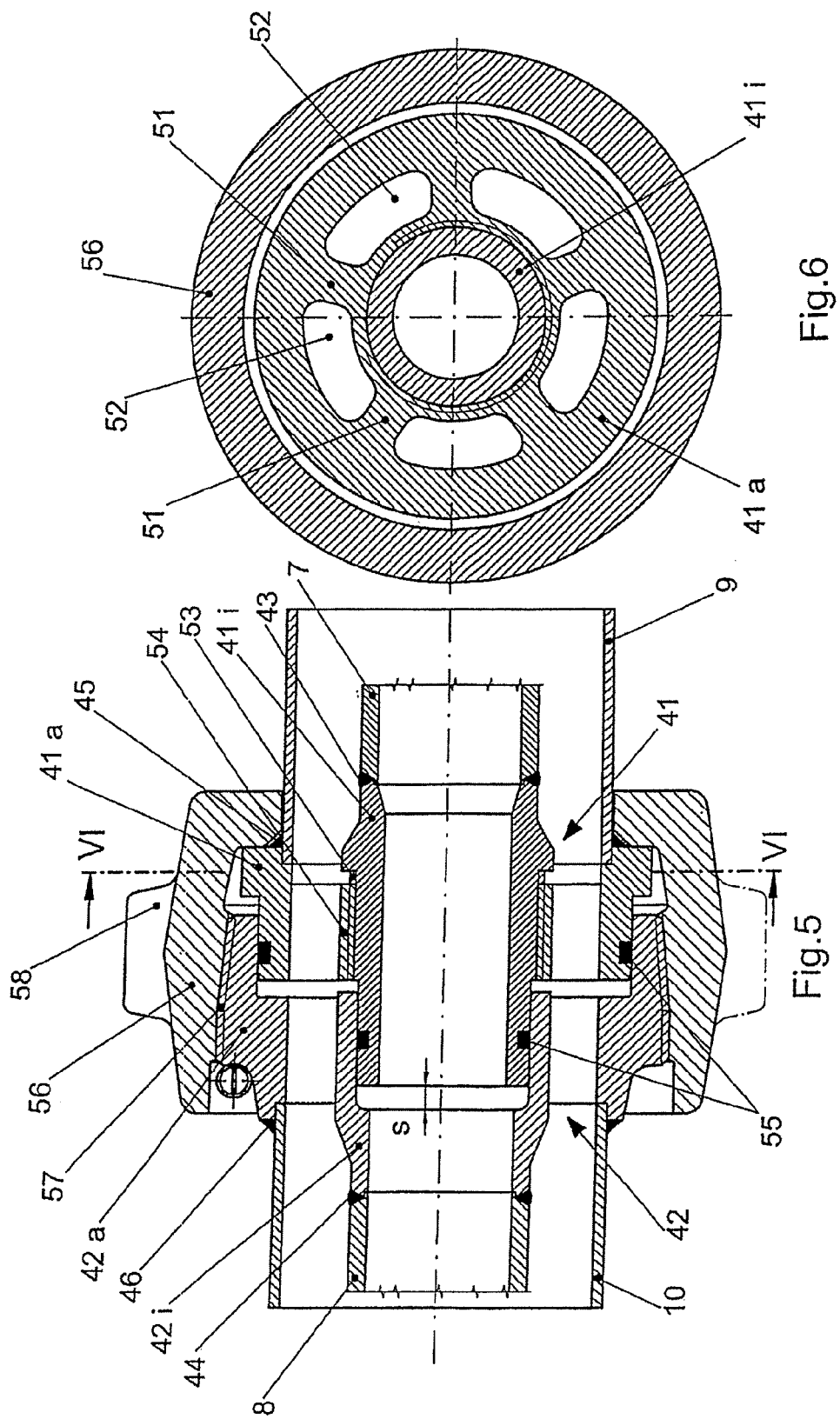

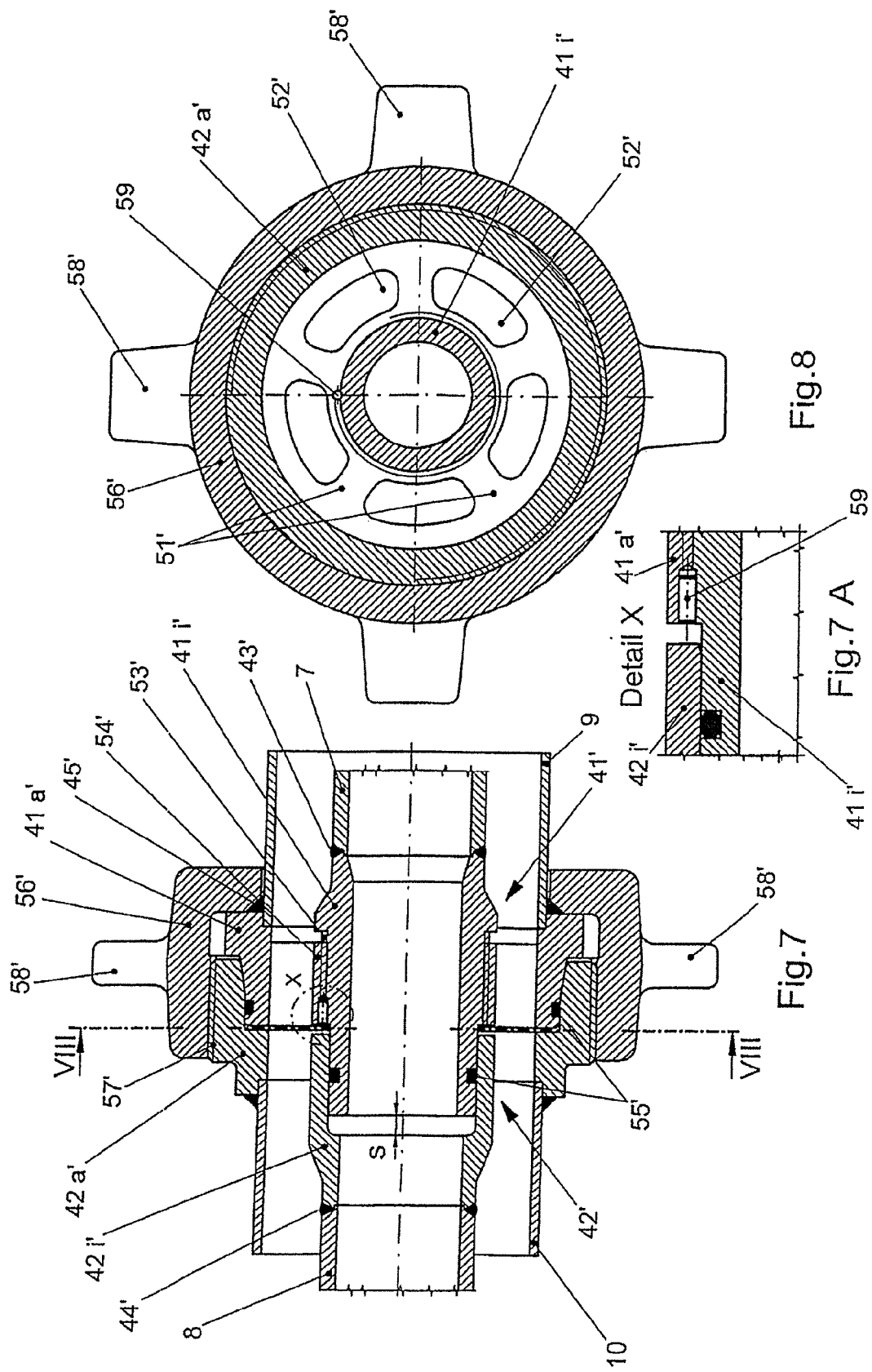

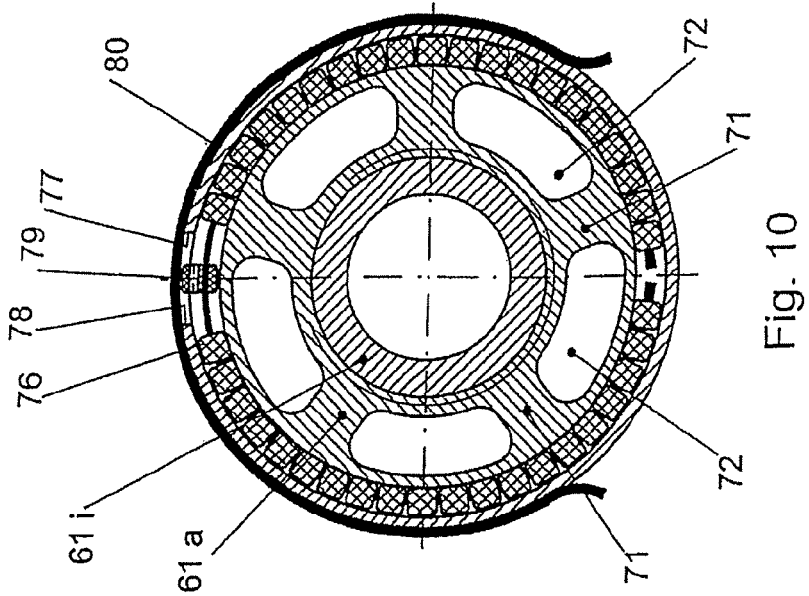
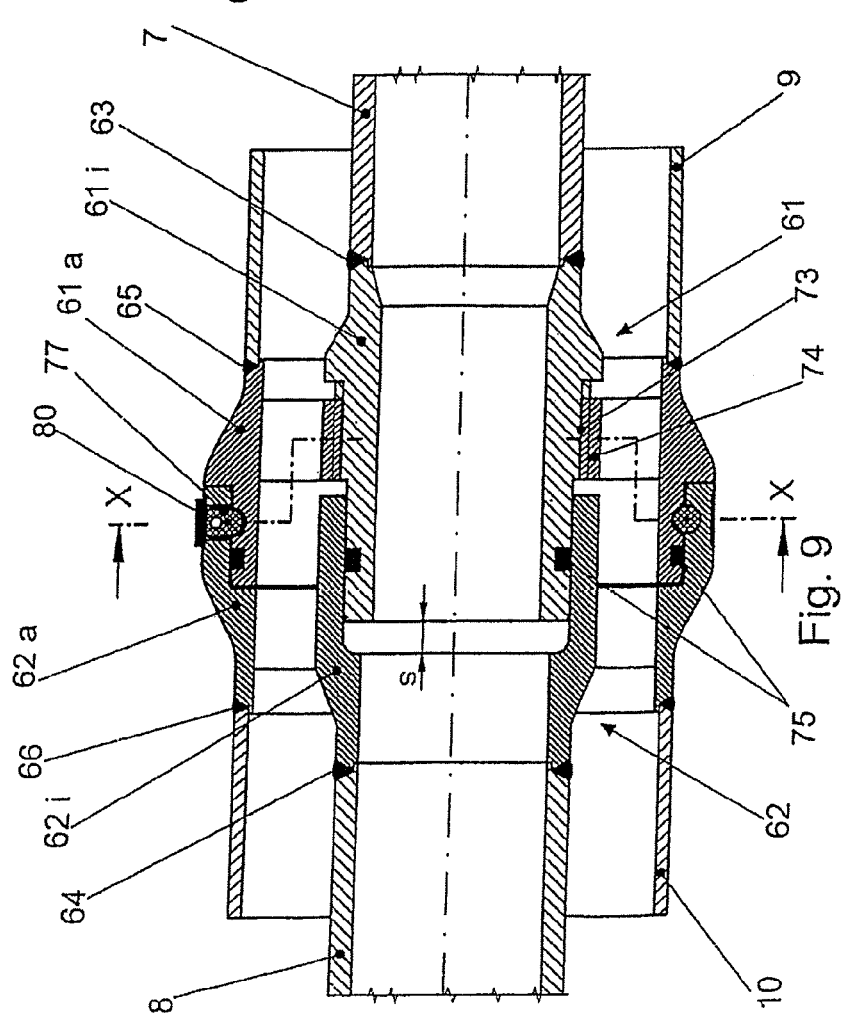

APPARATUS FOR CONNECTING DOUBLE JACKETED PIPES (TWO-PART PIPE COUPLING PART)

CROSS-REFERENCE TO RELATED APPLICATIONS AND CLAIM TO PRIORITY

This application is related to application number 10 2011 111 425.6, filed Aug. 31, 2011 and application number 20 2012 101 837.3, filed May 18, 2012, both in the Federal Republic of Germany, the disclosures of which are incorporated herein by reference and to which priority is claimed.

FIELD OF THE INVENTION

The present invention relates to an apparatus for connecting double jacketed pipes, comprising two pipe coupling parts corresponding to one another and a locking element for axially connecting the pipe coupling parts, the pipe coupling parts respectively having an inner ring to be welded to an inner pipe, an outer ring to be welded to a jacketed pipe, and between the inner ring and the outer ring respectively, a passage interrupted by a plurality of bars. Furthermore, the present invention relates to a method for connecting double jacketed pipes by means of such an apparatus.

BACKGROUND OF THE INVENTION

Apparatuses for connecting pipes, which are also called pipe couplings, are known in a wide variety of designs. Particularly favored are pipe couplings with which two pipe ends can easily be connected and released from one another again without any additional tools. Depending on the area of application for the pipelines, various demands are made of the pipe couplings to be used.

Efficient pipe couplings should make it possible to turn or pivot the connected pipes relative to one another, even in the laid state, without any negative impact upon the flow through or the function of the coupling. In addition, it should also be possible to use pipe couplings in lines to which high pressures are applied.

Pipe couplings are also used in lines in which two pipes run substantially coaxially into one another. These lines are known as a double pipe or also as a double jacketed pipe.

A generic pipe coupling for double jacketed pipes is known from DE 10 2009 052 674 A1. The pipe coupling shown makes provision for the connection of two pipelines lying one inside the other. There is a high pressure line on the inside here which is designed for pressures of up to approximately 400 bar, whereas the outer pipe is used as a return line (with pressures of approximately 40 to 70 bar). In order to be able to produce such a connection in conjunction with the necessary pipes a sliding sleeve ("telescopic pipe") is provided which after the welding of the inner pipe establishes the connection between the outermost pipe and the pipe coupling part.

This type of structure has numerous disadvantages, in particular from the aspect of production. The sliding sleeve constitutes an additional component which is required in order to be able to produce the different weld connections and in order to equalize length tolerances of the pipes. As a result of this five weld connections are required in order to produce a pipe with the corresponding pipe coupling parts. Between the sliding sleeve and the outer pipe located on the inside there is, moreover, the risk of increased onset of corrosion because an appropriate protective layer (galvanization for example) can not be applied in this area. Moreover, the pipe coupling parts made in one part have very large dimensions, and this is why solid material often has to be chosen as a source material for the machining because thick-walled pipes are not available in this size range. In addition to the high production complexity for processing this solid material, high costs also occur.

SUMMARY OF THE INVENTION

Therefore, the object underlying the invention is to configure and to further develop the double pipe coupling specified at the start and described in more detail above such that the disadvantages known from the prior art are avoided, that it can be produced inexpensively and easy fitting of the coupling is possible, and that equalization of production length tolerances of the individual pipes is made possible.

This object is achieved with an apparatus for connecting double jacketed pipes of the type specified at the start in that at least one of the pipe coupling parts is divided in form and has two separate components, namely an inner component which is formed by the inner ring or at least includes the latter and has an external thread, and an outer component which is formed by the outer ring or includes the latter and has an internal thread corresponding to the external thread of the inner component so that the outer component can be screwed onto the inner component. The configuration according to the invention of the pipe coupling part with two separate components that can be screwed to one another is associated with different advantages. Fitting thus proves to be easy. In this fitting the inner ring of the coupling part which is divided in form is first of all welded securely to the corresponding inner pipe. Next the outer component is screwed onto the inner component such that its outer ring comes to rest against the corresponding jacketed pipe. Finally, the outer ring is welded securely onto the jacketed pipe. Since the outer component is screwed with the outer ring onto the inner component, the outer ring can always be brought to rest axially against the jacketed pipe. In particular it is possible to equalize length tolerances which can also be a number of millimeters. For this purpose the external thread and the internal thread are designed and positioned such that the outer component can be screwed onto the inner component such that the outer component comes to rest against a jacketed pipe to be welded on when the inner component is securely welded onto an inner pipe. In particular the external thread of the inner component can be longer than the corresponding internal thread of the outer component.

Since in the non-pressurized state there is a certain degree of play on the thread, further advantages emerge in particular in underground use due to the possibility of the play on the thread equalizing tolerances, in particular the concentricity of the two seal seats. Furthermore, the outer pipe can partially absorb tensile stresses of the inner pipe and constitutes additional bend protection because it provides additional stability and so influences the critical bend length. The outer pipe (return pipe), that is normally made of S235, has greater elongation at rupture than the inner pipe (high pressure pipe) that is normally made of S355. Therefore, even if the high pressure pipe fails, the pipeline is still sealed to the outside because the return pipe can still be plastically deformed for a certain amount of time before it fails. Over this period of time a drop in pressure already takes place in the high pressure region so that by means of the arrangement pipelines lying one inside the other, the guarantee against complete failure of the pipeline with the risk of hydraulic fluid escaping under high pressure is clearly increased.

According to a further configuration of the invention a relative rotation of the pipe ends to be connected is achieved by the two pipe coupling parts being connected to one another rotatably. A twin pipe coupling configured in this way makes it possible, even after closure by the locking element, for the pipe piece welded onto the one pipe coupling part to turn easily about its axis towards the adjacent pipe piece welded onto the opposite pipe coupling part. This is necessary in some cases, e.g. in order to align a fitting or when turning pipeline sections. The relative movement between the fixed flanges can be achieved in particular by using lubricants and/or by using slide or rolling bearings.

According to one embodiment of the invention the inner rings of the two coupling parts are pushed one inside the other, there being play in the axial direction between the two inner rings. Alternatively or in addition, the outer rings of the two pipe coupling parts can be pushed one inside the other, there being play in the axial direction between the two outer rings. In the fitting of this type of pipe coupling or apparatus for connecting double jacketed pipes the pipe coupling part in divided form is first of all pre-fitted by the outer component being screwed onto the inner component. Next the inner rings and outer rings of the two pipe coupling parts are put together so that axial play remains between the inner rings on the one hand and the outer rings on the other hand. The pipe coupling pre-fitted in this way is positioned between the double jacketed pipes to be connected to one another, and the inner rings are welded securely to the corresponding inner pipes. The inner rings can thereby be reliably brought into contact with the corresponding inner pipes because the two pipe coupling parts can be moved towards one another. Next the corresponding jacketed pipe is brought to strike against the outer ring of the one-part pipe coupling part, and the two components are welded to one another. Finally the outer component of the pipe coupling part in divided form is screwed onto the inner component such that the outer component comes to rest against the corresponding jacketed pipe and the outer component can be welded securely to the jacketed pipe.

As already stated, the screw connection of the two components, which the one pipe coupling part has, serves to equalize length tolerances in the jacketed pipe. The axial play between the two inner rings and/or the two outer rings creates a further possibility for length equalization.

In a further configuration of the invention at least one ring seal is disposed between the inner ring of the one pipe coupling part and the outer ring of the other pipe coupling part—in particular in the radial direction. It goes without saying here that the ring seals are provided in those regions where there are sufficient sealing surfaces of the corresponding pipe coupling parts. The advantage of using a ring seal is that an exceptional sealing effect can be achieved, even with a relative movement between the surfaces to be sealed. The ring seal can be an O ring or a radial shaft sealing ring.

A further configuration of the invention makes provision such that the two components of the pipe coupling part are connected to one another in a rotatably fixed manner by means of at least one locking element. By means of the rotatably fixed connection torsional stresses acting on the pipe coupling parts can be reliably absorbed. This locking element is preferably a cylinder pin applied in the axial direction because this construction can be produced effectively and in a space-saving manner.

Further teaching of the invention makes provision such that the locking element, which fixes the pipe coupling parts axially, is in the form of a clamp or a combi-clamp. A clamp can often be operated manually by means of a tension lever connected to a spring and is characterized by easy and rapid fitting and removal without using any additional tools (so-called rapid coupling). Consequently, savings can also be made in staffing costs.

The advantage of the connection to a combi-clamp is that in the closed state the latter can be transported on the outer ring of the pipe coupling part of the collar piece of the pipe coupling. Furthermore, this type of combi-clamp can also be connected to a suspension lug because corresponding pipelines, which are often used in underground applications, are mostly suspended on the line extension in order to avoid deformations.

Alternatively, it is possible to design the locking element as the coupling nut. When using a coupling nut no additional (striking) tools are required either. Therefore, the connection is to be screwed together and released manually. Generally, re-tensioning after screwing down the coupling nut is not necessary. Often the threaded element and the coupling nut have a conical thread with a cylindrical runout. A non-clad thread can be used here or cladding can be applied by means of appropriately arranged additional seals. The cladding thereby provides reliable protection against contamination so that the connection can also be released again easily, even after a long period of operation. Moreover, a splint can be provided that prevents undesired untwisting and increases the operational reliability of the double pipe coupling.

Other teaching of the invention makes provision such that the locking element, which fixes the pipe coupling parts axially, is in the form of a bead chain. By using a bead chain for the axial locking a particularly small amount of friction between the fixed flanges can be achieved, by means of which they can rotate easily relative to one another. A coupling with a bead chain is known in its own right from DE 33 24 271 A1.

According to further teaching of the invention provision is made such that a double nipple, which has an inner ring and an outer ring connected in a rotatably fixed manner to the inner ring, is disposed rotatably between the pipe coupling parts. The use of a double nipple makes it possible to design the two pipe coupling parts identically. The advantage of this, especially with the casting production of the pipe coupling parts, for example of cast steel, is that only one casting mould has to be used. In this way the pipe coupling parts can be produced more economically. The double pipe coupling can have a double nipple with any type of lock, in particular with an axial lock by means of a clamp, coupling nut or bead chain.

Finally, in a further configuration of the invention it is proposed to configure the inner pipes as a high pressure supply line and the jacketed pipes as a return line for use in underground mining. By using double pipelines, in comparison to individual pipelines lying next to one another, the space for an additional line can be saved in the laying process, and this is particularly advantageous in restricted spatial settings, for example underground. It is therefore proposed to make the high pressure supply lines and return lines used in coal mining for the water hydraulics, preferably as a double pipeline.

In the high pressure supply line there prevails an operating pressure of approximately 40 MPa, whereas the return line is operated at approximately 4-7 MPa. Double pipelines are also an option for this application due to the different pressures because the wall thickness of the inner high pressure line can be chosen independently of the wall thickness of the outer low pressure or return line. For the proposed application this can mean that the wall thickness of the inner pipes is greater than the wall thickness of the jacketed pipes.

Moreover, it is an advantage of the underground use of a double jacketed pipe that if there is a leak in the more greatly stressed inner pipe—due to the higher pressure—the jacketed pipe lying on the outside prevents the fluid from passing immediately out of the double jacketed pipe. This reduces the risk of injury, and in particular in mining, unnecessary repairs at locations which are difficult to access can thus be avoided.

In pipeline systems with a number of double pipe couplings, between which relatively long, for example a number of meters long, double jacketed pipes are inserted, it is proposed to fit spacers between the inner pipes and the jacketed pipes at pre-specified intervals which—comparably to the fixed flanges—space the two pipes radially.

According to a further aspect of the invention provision is made such that the cross-overs between the bars of one pipe coupling part or both pipe coupling parts are rounded in form in their cross-over region to the corresponding inner ring and/or outer ring.

In a pipe coupling part made in one part the bars can be rounded in form on their face surface facing towards the outside of the coupling and in the cross-over region to the outer ring as well as in the cross-over region to the inner ring and thereby form in particular a curve which is for example partially circular in form. On their face surface facing towards the inside of the coupling the bars of the one-part pipe coupling part can only be rounded at their cross-over to the inner ring. In a pipe coupling part that is designed in a number of parts in the way according to the invention, the bars can be rounded on their face surface facing towards the inside of the coupling and/or on their face side facing towards the outside of the coupling in the cross-over region to the outer ring. Rounding towards the inner ring is not an option because the screw connection between the inner and the outer component takes place here.

By means of this configuration the loading of the pipe coupling parts due to shearing stresses can be kept low.

BRIEF DESCRIPTION OF THE DRAWINGS

In the following the invention is described in more detail by means of drawings only showing preferred exemplary embodiments.

The drawings show as follows:

FIG. 1 a longitudinal section of a double pipe coupling with a clamp as an axial locking element, FIG. 2 the object of FIG. 1 in cross-section along line II-II, drawn without the clamp, FIG. 3 a longitudinal section of a double pipe coupling with a combi-clamp as an axial locking element, FIG. 4 the object of FIG. 3 in cross-section along line IV-IV, drawn without the clamp, FIG. 5 a longitudinal section of a double pipe coupling with a coupling nut and a thread as the axial locking element, FIG. 6 the object of FIG. 5 in cross-section along line VI-VI, FIG. 7 a longitudinal section of a further exemplary embodiment of a double pipe coupling with a coupling nut and a thread as the axial locking element, FIG. 7A a detail enlargement of the area "X" of FIG. 7, FIG. 8 the object of FIG. 7 in cross-section along line VIII-VIII, FIG. 9 a longitudinal section of a double pipe coupling with a divided bead chain as an axial locking element, FIG. 10 the object of FIG. 9 in cross-section along line X-X and FIG. 11 a longitudinal section of a further embodiment of a double pipe coupling.

DETAILED DESCRIPTION OF THE PREFERRED EMBODIMENTS

Figure 11:
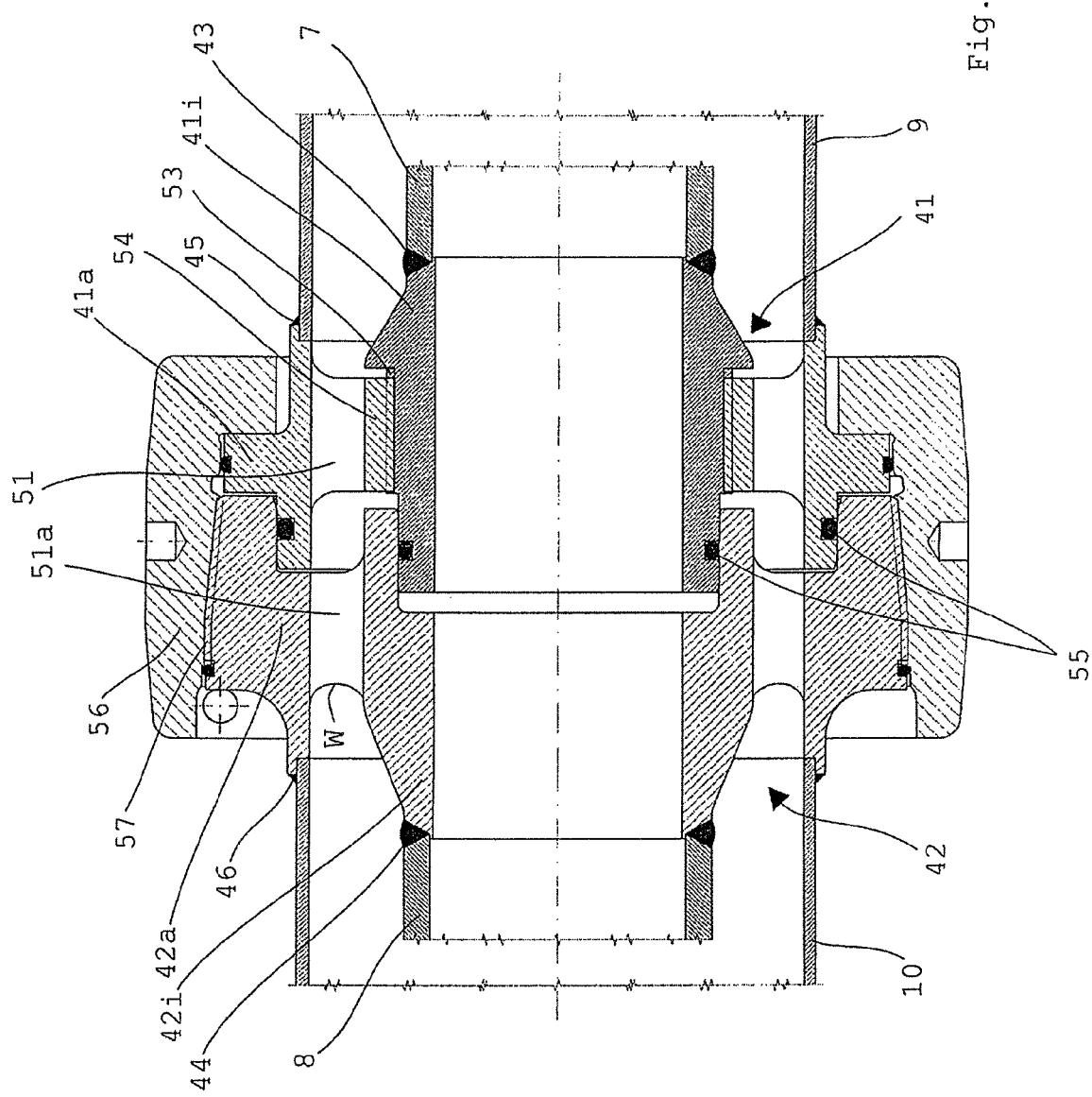

FIG. 1 shows an apparatus for connecting double jacketed pipes which is also referred to in the following as a double pipe coupling. The double pipe coupling shown has essentially two pipe coupling parts 1, 2 and a locking element for axially connecting the pipe coupling parts 1, 2. The pipe coupling parts 1, 2 respectively have an inner ring 1$i$ and 2$i$ and an outer ring 1$a$ and 2$a$, each of the inner rings 1$i$ and 2$i$ having a weld-on end 3 and 4, and each of the outer rings 1$a$ and 2$a$ having a weld-on end 3 and 4. By means of the weld-on ends 3, 4, 5, 6 the pipe coupling parts 1, 2 are welded onto the ends of an inner pipe 7, 8 and a jacketed pipe 9, 10 respectively. The inner pipes 7, 8 and the jacketed pipes 9, are arranged substantially collinearly so that a jacket annular space (not identified any more closely) is respectively formed between the inner pipe 7 and the jacketed pipe 9 and between the inner pipe 8 and the jacketed pipe 10.

As emerges from FIG. 2, passages 12 interrupted by bars 11 arranged evenly around the circumference are provided between the outer ring 1$a$ and the inner ring 1$i$ in order to guarantee the flow of medium in the jacketed pipe. The same also applies of course, even if not shown, to the pipe coupling part 2.

According to the invention the pipe coupling part 2 located on the right in FIG. 1 comprises two separate components, namely an inner component, which is formed essentially by the inner ring 1$i$ of the pipe coupling part 1, and an outer component, which is formed by the outer ring 1$a$ with the bars 11 and the passages 12. Here the outer component is screwed onto the inner component. For this purpose the inner ring 1$i$ has an external thread 13 and the outer component has a corresponding internal thread 14. As can be seen in FIG. 1, the external thread 13 is made longer than the corresponding internal thread 14. By means of the screw connection, and in particular the threads 13, 14 of different lengths, equalization of length tolerances due to production between the inner pipe 7 and the jacketed pipe 9 take place because the outer component of the pipe coupling part 1 can be brought to strike axially against the jacketed pipe 9 after welding the inner ring 1$i$ securely onto the inner pipe 7 by the outer component of the coupling part 1 being turned with respect to the inner ring 1$i$.

The two pipe coupling parts 1, 2 are connected to one another in a way known in its own right by a clamp 16 which is laid around the pipe coupling parts 1, 2 and encompasses the radially projecting shoulders of the pipe coupling parts 1, 2 in order to fix the pipe coupling parts 1, 2 to one another axially.

As can be seen well in FIG. 1, the inner rings 1$i$, 2$i$ of the two pipe coupling parts 1, 2 are pushed one inside the other, play S being provided in the axial direction between the two inner rings 1$i$, 2$i$. In the same way the outer rings 1$a$, 2$a$ of the two pipe coupling parts 1, 2 are also pushed one inside the other, play remaining in the axial direction between the two outer rings 1$a$, 2$a$. The annular gaps between the inner rings 1$i$, 2$i$ and the outer rings 1$a$, 2$a$ are thereby sealed by corresponding ring seals 15.

For fitting the two pipe coupling parts 1, 2 are first of all put together. Next the two inner rings 1$i$, 2$i$ are welded securely to the corresponding inner pipes 7, 8 in the region of their weld-on ends 3, 4. Here the inner rings 1$i$, 2$i$ can be positioned precisely on the inner pipes 7, 8 because the two pipe coupling parts 1, 2 can be moved axially towards one another. Next the jacketed pipe 10, on the left in the drawing, is brought to strike against the one-part pipe coupling part 2. Now the outer component is turned with the outer ring 1$a$ of the two-part pipe coupling part 1 with respect to the inner ring 1$i$ until it strikes against the jacketed pipe 9 on the right in the drawing. Finally the weld seams between the jacketed pipes 9, 10 and the weld-on points 5, 6 of the outer rings 1$a$, 2$a$ are produced.

In the following exemplary embodiments the same/similar components are identified by reference numbers respectively increased by 20.

FIGS. 3 and 4 show a similar structure of a double pipe coupling, a combi-clamp 36 being used instead of the clamp 16. The advantage of using a combi-clamp is that during transportation the latter is held by form-fit against the outer ring 22a and in a circumferential groove 37. In the exemplary embodiment illustrated, and in this respect preferred, the combi-clamp 36 has two clamp halves 36A and 36B and is placed in a fixed position lying around the outer ring 22a (and 21a). It emerges from FIG. 4 that a suspension lug 38 is disposed in the upper region of the clamp half 36A in order to be able to suspend the pipeline provided with the double pipe coupling according to the invention, for example when used in underground mining.

FIGS. 5 and 6 as well as 7 and 8 show two alternatives of a double pipe coupling wherein the two outer rings 41a, 42a and 41a', 42a' are respectively fixed by a coupling nut 56 and 56' with a thread 57 and 57' in the axial direction. The fitting and removal of the double pipe coupling according to the invention and shown in FIGS. 5 and 6 enables manual connection because the thread 57 of the coupling nut 56 is conical in form with a cylindrical structure. However, the use of a coupling nut 56' with a cylindrical thread 57' always requires a striking tool for fitting/removal.

The coupling nuts 56, 56' shown have radially spaced bars 58 and 58', however it is also possible, although not illustrated, for the coupling nuts to also be provided with corresponding radial blind holes in order to be closed and opened by means of a corresponding tool. In this case, however, the pipe coupling equipped in this way is made considerably smaller than with the projecting bars 58 and 58'.

In the exemplary embodiment according to FIGS. 7 and 8 it is shown, furthermore, that the inner ring 41i' and the corresponding outer ring 41a' of the pipe coupling part 41' can be connected to one another, in a rotatably fixed manner, in the desired position, for example by using a cylinder pin 49, in the exemplary embodiment illustrated shown applied in the axial direction. A rotatably fixed connection is particularly required if additional torsional moments are introduced into the screw connection, as is the case, for example, in the exemplary embodiment according to FIGS. 7 and 8. The embodiment with the cylinder pin 49 can be seen particularly well from the detailed illustration according to FIG. 7A.

Otherwise the structure of the double pipe couplings shown in FIGS. 5 to 8 corresponds to that of the illustrations in FIGS. 1 to 4.

In FIG. 9 a further configuration of the double pipe coupling is shown. Here, in the exemplary embodiment shown, a single bead chain 76 is provided as an axial locking element. There is introduced into the outer rings 61a and 62a a common circumferential groove 77 into which the bead chain 76 is inserted in order to prevent axial movement of the two pipe coupling parts 61 and 62. The insertion and withdrawal of the bead chain 76 proves to be particularly easy if a two-part bead chain 76, i.e. a bead chain 76 with two loose ends, is used. The latter is introduced into the groove 77 through an opening 78, a fitting aid 79 in the region of the recess 78 providing correct positioning. The chain links of the bead chain 76 can be beads, rollers, discs, cylinders or the like. In order to prevent the bead chain 76 from falling out or being pulled out by accident the recess 78 can be covered with a protective bracket 80 which can be seen particularly clearly in FIG. 10. It is not shown that the circumferential groove 77 can also have a lubricant, in particular lubricating grease, applied to it by means of an appropriately positioned lubricating nipple in order to simplify the subsequent removal of the bead chain 76 from the double pipe coupling.

Finally, FIG. 11 shows a further embodiment of a double pipe coupling according to the invention. The latter corresponds essentially to the embodiment shown in FIG. 5. The only difference is the configuration of the bars 51, 51a of the pipe coupling parts 41, 42. Therefore the bars 51a of the pipe coupling part 42 made in one part are rounded in form on their side facing the outside of the coupling, i.e. facing the left in the cross-over to the outer ring 42a and to the inner ring 42i such as to form a partially circular curve W. Furthermore, the bars 51a are rounded on their right side facing towards the inside of the coupling in their cross-over to the inner ring 42i. Since the bars 51a end flush with the outer ring 42a on their side facing inwards, the cross-over is formed in a straight line here.

Similarly, the bars 51 of the two-part right-hand pipe coupling part 41 are rounded on their inwardly facing face surface and on their outwardly facing face surface in the cross-over to the outer ring 41a. Since the outer component of the two-part pipe coupling part 41 is screwed with the outer ring 41a and the bars 51 onto the inner ring 41i, rounded cross-overs are not possible here.

By means of the rounded cross-overs the loads acting on the pipe coupling due to shearing stresses are kept small during operation.

The present invention has been described herein in terms of one or more preferred embodiments. However, it should be understood that numerous modifications and variations to these embodiments would be apparent to those skilled in the art upon a reading of the foregoing description. Therefore, it is intended that any such modifications and variations comprise a part of this invention, provided they come within the scope of the following claims and their equivalents.

I claim:

1. An apparatus for connecting double jacketed pipes, comprising two pipe coupling parts (1, 2; 21, 22; 41, 42; 41', 42'; 61, 62) corresponding to one another and a locking element (16; 36; 56; 56', 76) for axially connecting the pipe coupling parts (1, 2; 21, 22; 41, 42; 41', 42'; 61, 62);

the pipe coupling parts (1, 2; 21, 22; 41, 42; 41', 42'; 61, 62) respectively having an inner ring (1i, 2i; 21i, 22i; 41i, 42i; 41i', 42i'; 61i, 62i) to be welded to an inner pipe (7, 8), an outer ring (1a, 2a; 21a, 22a; 41a, 42a; 41a', 42a'; 61a, 62a) to be welded to a jacketed pipe (9, 10), and between the inner ring (1i, 2i; 21i, 22i; 41i, 42i; 41i', 42i'; 61i, 62i) and the outer ring (1a, 2a; 21a, 22a; 41a, 42a; 41a', 42a'; 61a, 62a) respectively a passage (12, 32, 52, 52', 72) interrupted by a plurality of bars (11, 31, 51, 51', 71), characterized in that at least one of the pipe coupling parts (1, 21, 41, 41', 61) is divided in form and has two separate components, namely an inner component (1i, 21i, 41i, 41i', 61i) which is formed by the inner ring (1i, 2i; 21i, 22i; 41i, 42i; 41i', 42i'; 61i, 62i) and has an external thread (13, 33, 53, 53', 73), and an outer component (1a, 21a, 41a, 41a', 61a) which is formed by the outer ring (1a, 2a; 21a, 22a; 41a, 42a; 41a', 42a'; 61a, 62a) and has an internal thread (14, 34, 54, 54', 74) corresponding to the external thread (13, 33, 53, 53', 73) of the inner component (1i, 21i, 41i, 41i', 61i) so that the outer component (1a, 21a, 41a, 41a', 61a) can be screwed onto the inner component (1i, 21i, 41i, 41i', 61i)

wherein the inner ring (1i, 2i; 21i, 22i; 41i, 42i; 41i', 42i'; 61i, 62i) of one of the two pipe coupling parts (1, 2; 21, 22; 41, 42; 41', 42'; 61, 62) is pushed inside the inner ring of the other pipe coupling part, there being play (S) in the axial direction between the two inner rings (1*i*, 2*i*; 21*i*, 22*i*; 41*i*, 42*i*; 41*i*', 42*i*'; 61*i*, 62*i*).

2. The apparatus according to claim 1, characterized in that the two pipe coupling parts (1, 2; 21, 22; 41, 42; 41', 42', 61, 62) are connected to one another rotatably.

3. The apparatus according to claim 2, characterized in that the outer rings (1*a*, 2*a*; 21*a*, 22*a*; 41*a*, 42*a*; 41*a*', 42*a*'; 61*a*, 62*a*) of the two pipe coupling parts (1, 2; 21, 22; 41, 42; 41', 42'; 61, 62) are pushed one inside the other, there being play (S) in the axial direction between the two outer rings (1*a*, 2*a*; 21*a*, 22*a*; 41*a*, 42*a*; 41*a*', 42*a*'; 61*a*, 62*a*).

4. The apparatus according to claim 3, characterized in that at least one ring seal (15, 35, 55, 55', 75) is disposed between the inner ring (1*i*, 21*i*, 41*i*, 41*i*', 61) of the one pipe coupling part (1, 21, 41, 41', 61) and the inner ring (2*i*, 22*i*, 42*i*, 42*i*', 62*i*) of the other pipe coupling part (2, 22, 42, 42', 62) and/or between the outer ring (1*a*, 21*a*, 41*a*, 41*a*', 61*a*) of the one pipe coupling part (1, 21, 41, 41', 61) and the outer ring (2*a*, 22*a*, 42*a*, 42*a*', 62*a*) of the other pipe coupling part (2, 22, 42, 42', 62).

5. The apparatus according to claim 1, characterized in that the outer rings (1*a*, 2*a*; 21*a*, 22*a*; 41*a*, 42*a*; 41*a*', 42*a*'; 61*a*, 62*a*) of the two pipe coupling parts (1, 2; 21, 22; 41, 42; 41', 42'; 61, 62) are pushed one inside the other, there being play (S) in the axial direction between the two outer rings (1*a*, 2*a*; 21*a*, 22*a*; 41*a*, 42*a*; 41*a*', 42*a*'; 61*a*, 62*a*).

6. The apparatus according to claim 5, characterized in that at least one ring seal (15, 35, 55, 55', 75) is disposed between the inner ring (1*i*, 21*i*, 41*i*, 41*i*', 61) of the one pipe coupling part (1, 21, 41, 41', 61) and the inner ring (2*i*, 22*i*, 42*i*, 42*i*', 62*i*) of the other pipe coupling part (2, 22, 42, 42', 62) and/or between the outer ring (1*a*, 21*a*, 41*a*, 41*a*', 61*a*) of the one pipe coupling part (1, 21, 41, 41', 61) and the outer ring (2*a*, 22*a*, 42*a*, 42*a*', 62*a*) of the other pipe coupling part (2, 22, 42, 42', 62).

7. The apparatus according to claim 1, characterized in that the two parts (1*i*, 1*a*; 21*i*, 21*a*; 41*i*, 41*a*; 41*i*', 41*a*'; 61*i*, 61*a*) of the pipe coupling part (1, 21, 41, 41', 61) are connected to one another in a rotatably fixed manner by means of at least one locking element (59).

8. The apparatus according to claim 7, characterized in that the at least one locking element is in the form of a cylinder pin (59) applied in the axial direction.

9. The apparatus according to claim 1, characterized in that the locking element for axially connecting the pipe coupling parts (1, 2) is in the form of a clamp (16) or that the locking element for axially connecting the pipe coupling parts (21, 22) is in the form of a combi-clamp (36), which in the closed state can be transported on the outer ring (22*a*) of the pipe coupling part (22) and/or which has a suspension lug (37), or that the locking element for axially connecting the pipe coupling parts (41, 42) is in the form of a coupling nut (56, 56').

10. The apparatus according to claim 1, characterized in that a double nipple, which has an inner ring and an outer ring connected in a rotatably fixed manner to the inner ring, is disposed rotatably between the pipe coupling parts.

11. The apparatus according to claim 1, characterized in that the inner pipes (7, 8) are configured as a high pressure supply line and the jacketed pipes (9, 10) as a return line for use in underground mining.

12. The apparatus according to claim 1, characterized in that the external thread (13, 33, 53, 53', 73) of the inner component (1*i*, 21*i*, 41*i*, 41*i*', 61*i*) is longer than the corresponding internal thread (14, 34, 54, 54', 74) of the outer component (1*a*, 21*a*, 41*a*, 41*a*', 61*a*).

13. An apparatus for connecting double jacketed pipes, comprising two pipe coupling parts (1, 41, 42) corresponding to one another and a locking element (56) for axially connecting the pipe coupling parts (41, 42);
the pipe coupling parts (41, 42) respectively having an inner ring (41*i*, 42*i*) to be welded to an inner pipe (7, 8), an outer ring (41*a*, 42*a*) to be welded to a jacketed pipe (9, 10), and between the inner ring (41*i*, 42*i*) and the outer ring (41*a*, 42*a*) respectively a passage (52) interrupted by a plurality of bars (51, 51*a*),
according to claim 1, characterized in that the bars (51*a*, 51) of a pipe coupling part (42) or of both pipe coupling parts (42, 41) are rounded in form in their cross-over region to the respectively corresponding outer ring (41*a*, 42*a*) and/or inner ring (42*i*).

14. The apparatus according to claim 13, characterized in that the bars (51*a*) of a pipe coupling part (42) formed in one part are rounded in form on their face surface facing towards the outside of the coupling both in the cross-over region to the outer ring (42*a*) and in the cross-over region to the inner ring (42*i*).

15. The apparatus according to claim 14, characterized in that the bars (51*a*) of a pipe coupling part (42) are rounded on their face surface facing towards the inside of the coupling only on their cross-over to the inner ring (42*i*).

16. The apparatus according to claim 13, characterized in that the bars (51*a*) of a pipe coupling part (42) are rounded on their face surface facing towards the inside of the coupling only on their cross-over to the inner ring (42*i*).

17. A method for connecting double jacketed pipes which respectively comprise an inner pipe (7, 8) and a jacketed pipe (9, 10) by means of the apparatus for connecting double jacketed pipes according to any of claims 1 to 15, wherein each of the inner rings (1*i*, 2*i*; 21*i*, 22*i*; 41*i*, 42*i*; 41*i*', 42*i*'; 61*i*, 62*i*) is welded to a corresponding inner pipe (7, 8) and each of the outer rings (1*a*, 2*a*) is welded to a corresponding jacketed pipe (9, 10), characterized in that the pipe coupling part (1, 21, 41, 41', 61) in divided form is pre-fitted by the outer component being screwed onto the inner component, the inner ring (1*i*, 21*i*, 41*i*, 41*i*', 61*i*) of the pipe coupling part (1, 21, 41, 41', 61) in divided form being welded securely to the corresponding inner pipe (7), next the outer component being screwed onto the inner component such that the outer component comes to rest against the corresponding jacketed pipe (9), and finally the outer component being welded securely to the jacketed pipe (9).

18. The method according to claim 17, characterized in that the inner rings (1*i*, 2*i*; 21*i*, 22*i*; 41*i*, 42*i*; 41*i*', 42*i*'; 61*i*, 62*i*) and the outer rings (1*a*, 2*a*; 21*a*, 22*a*; 41*a*, 42*a*; 41*a*', 42*a*'; 61*a*, 62*a*) of the two pipe coupling parts are put together so that axial play remains between the inner rings and the outer rings,
the corresponding jacketed pipe (10) is brought to strike against the outer ring (2*a*, 22*a*, 42*a*, 42*a*', 62*a*) of the one-part pipe coupling part (2, 22, 42, 62),
the outer component of the pipe coupling part (1, 21, 41, 61) in divided form is screwed onto the inner component such that the outer component comes to rest against the corresponding jacketed pipe (9) and the outer component is welded securely onto the jacketed pipe (9).

\* \* \* \* \*